United States Patent [19]

Fink, Jr.

[11] Patent Number: 4,827,977
[45] Date of Patent: May 9, 1989

[54] BREAKAWAY HOSE COUPLING

[75] Inventor: Arthur C. Fink, Jr., Franklin County, Mo.

[73] Assignee: Husky Corporation, Pacific, Mo.

[21] Appl. No.: 256,053

[22] Filed: Oct. 11, 1988

[51] Int. Cl.[4] ............................................. F16L 37/28
[52] U.S. Cl. .................................... 137/614.04; 285/1; 285/304; 285/900
[58] Field of Search ...................... 137/614.03, 614.04; 285/1, 304, 900

[56] References Cited

U.S. PATENT DOCUMENTS

| | | | |
|---|---|---|---|
| 2,642,297 | 6/1953 | Hanna | 285/304 |
| 4,617,975 | 10/1986 | Rabushka et al. | 285/2 X |
| 4,682,795 | 7/1987 | Rabuska et al. | 285/1 |
| 4,691,941 | 9/1987 | Rabushka et al. | 285/304 X |

Primary Examiner—Gerald A. Michalsky
Attorney, Agent, or Firm—Paul M. Denk

[57] ABSTRACT

A breakaway hose coupling for application within a fuel line, that prevents untimely decoupling, and avoids unnecessary leakage. The coupling includes a pair of fittings, for connecting to the fuel line, a sleeve provided for limited sliding movement upon one of the fittings, with each fitting incorporating a poppet valve, to provide for closure when decoupling occurs, or other unseating, from within the respect fittings, during normal coupling assembly and usage. Detents are provided within one of the fittings for interconnecting within a seating groove provided interiorly of the sleeve, to normally retain the coupling assembled, but various fastening rings, arranged within the sleeve and one of the fittings, provides for limited shiftable movement, occuring when tensioning force is exerted, to provide clearance for disconnection, while at the same time, said fastening rings capable of shifting, to provide for recoupling of the device together upon assembly. A fluid chamber is provided intermediate select of the fastening rings, to provide an equalization and counterbalancing of fluid pressures, when internal pressures spikes generated within the coupling and hose line occur, so as to prevent untimely disconnection, or leakage from the coupling, during routine usage.

7 Claims, 3 Drawing Sheets

BREAKAWAY HOSE COUPLING

CROSS-REFERENCE TO RELATED APPLICATION

The subject matter of this application is related to the subject matter of the application and patent of Arthur C. Fink, Jr., pertaining to Butterfly Valve for Fluid Flow Line, now U.S. Pat. No. 4,667,883, and owned by a common assignee.

BACKGROUND OF THE INVENTION

This invention relates generally to means for preventing and stopping fluid passage through a flow line, such as a gasoline line used in conjunction with fuel dispensing at a service station, and particularly at that instance when a severance occurs in the line, and when a loss of fluid may be encountered, such as when the driver of a vehicle may ride off with the gasoline nozzle inadvertently still inserted within the fuel tank. This invention is especially useful when applied in a fuel line, and functions as a check valve to prevent fuel flow under particular adverse conditions.

There are an infinite number of valve means in the prior art that furnish a shut-off of fluid or other fuel flow, and more particularly, such mechanisms normally are utilized in flow lines where fuel may be flowing, and generally in those situations when the conduit comprises the fuel line leading from a gasoline dispenser to its nozzle. For example, as can be seen in the U.S. Pat. No. 2,642,297, to Hanna, breakaway coupling that responds to tension in the line in which it locates is held together through a combination of male and female connectors, and detents that provide bearing engagement between the two components. In addition, the U.S. Pat. Nos. 4,617,975, and 4,691,941, to Rabushka, disclose various types of tension actuated uncouplers, for use in the delivery of gasoline to a vehicle from a gas pump. The problems that have been encountered with the style of uncouplers as explained in these prior patents is that they have a tendency to leak, and when any internal pressure is exerted within the fuel line, such as may occur when pumping of the gasoline is being performed, excessive pressures may momentarily be generated within the fuel line, and particularly at the location of the uncoupler, which has a tendency to further cause leakage, and in some instances, has actually forced the uncoupling device to prematurely come apart. This predicament has generally been recognized by the applicant as primarily occurring in those type of breakaway couplings that are constructed having unequal internal surfaces that cause greater fluid forces to be exerted in one direction upon one part of the coupling than is exerted upon the other, and are inherent because of the construction of the coupling device, such that when the spontaneous high pressures are encountered, the pressure exerted upon one component of the coupling device and which exerts a pressure in one direction, is substantially different from the fluid pressure that may be exerted upon the other component of the coupling device, and therefore, this disparity in pressures has a tendency to force the coupler to prematurely separate, in an untimely and dangerous fashion. This can and has occurred particularly where the fluid pressure generated within the hose may undertake a phenomonon that is equivalent to what is known in the art as "water hammer," caused by the pumping of the fuel through the flow line, and provides pressure spikes that build up rather significantly and substantially, throughout the hose, momentarily, and even at the location of the uncoupling device, as when the flow is suddenly stopped, for example, when the fuel tank is full. Hence, leakage at such couplers has frequently occurred in the field, and on occasion, as previously explained, untimely separation of the uncoupler has happened.

Other United States patents that show various related uncoupling devices include the U.S. Pat. No. 4,449,545, disclosing a poppet valve having a conical surface that is disposed for seating upon a valve seat, when breakage occurs between the various body components making up the plug and socket of the shown valve. There are a great variety of other types of hose couplers, employed in the art, as can be seen in the U.S. Pat. No. 2,777,716, to Gray, showing a socket type hose coupler with reciprocating detent. Another form of quick disconnect coupler and safety check valve is shown in U.S. Pat. No. 4,060,219, to Crawford. In addition to the foregoing, the patent to Shames, U.S. Pat. No. 4,070,003, also discloses a coupler with automatic shut-off, but as can be seen, the sealing means provided therein is of substantial size, and causes significant disruption to the normal flow of fluid through the coupler. Another type of valve assembly is shown in U.S. Pat. No. 4,307,744, to Morrison. An additional form of break-away safety valve is shown in U.S. Pat. No. 4,064,889, to Gayle, wherein there is incorporated a ball valve which prevents the discharge of gasoline vapors in the event that a break occurs.

Other patents showing decoupling devices, for use in flow lines, of various types, are shown in the U.S. Pat. No. 2,906,280, to Mount, entitled "Break-Away Coupling." The U.S. Pat. No. 3,741,521, to Tatsuno, shows a pipe coupling with safety valve. The U.S. Pat. No. No. 1,410,218, to Pamer, discloses a gas valve. The U.S. Pat. No. No. 2,777,716, to Gray, discloses a socket type hose coupler with reciprocating detent. The U.S. Pat. No. 2,898,926, to Tsiguloff, shows a safety disconnect valve for use in conjunction with fuel dispensing. The U.S. Pat. No. 3,085,589, to Sands, discloses a safety valve. Another patent to Sands, U.S. Pat. No. 3,122,162, shows a flow control device. The patent to Shames, U.S. Pat. No. 4,070,003, shows a coupler with automatic shut-off. The patent to Allread, U.S. Pat. No. 4,119,111, discloses a frangible hose end fitting. The patent to Sands, U.S. Pat. No. 3,085,589, shows a safety valve. The patent to Johnson, U.S. Pat. No. 2,048,388, discloses another form of safety device, for use in conjunction with fuel dispensing. The patent to Scheiwer, U.S. Pat. No. 2,135,221, discloses a coupling used within a flow line. The patent to Clark, U.S. Pat. No. 2,452,430, shows another form of quick disconnect coupling. The patent to Yonkers, U.S. Pat. No. 2,455,544, shows a related type of pipe coupling. The patent to Scheiwer, U.S. Pat. No. 2,536,702, discloses a coupling for use within a flow line, and incorporating ball type coupling members. Pasker, U.S. Pat. No. 2,599,935, discloses a hydraulic line coupling. Wurmser, U.S. Pat. No. 2,631,872, discloses a quick coupling device for flow lines. Clark, in his U.S. Pat. No. 2,860,893, shows a ball detent type coupling with breakaway feature. Burning, U.S. Pat. No. 3, 317,220, shows a releasable fluid coupling. Bolton, Jr., in U.S. Pat. No. 3,334,860, discloses a fluid coupling. Shendure, U.S. Pat. No. 3,715,099, discloses a valved quick-disconnect coupling. Silvana, in U.S. Pat. No. 3,918,679, discloses a universal coupling. Taylor, in his U.S. Pat. No. 4,098,438, discloses a gasoline spill prevention system and apparatuses. The patent to Morrison, U.S. Pat. No. 4,24,228, shows a pressure-balanced fluid coupling. The patent to Parrish, U.S. Pat. No. 4,392,513, shows a quick disconnect safety coupling. The patent to Scheiwer, U.S. Pat. No. 2,536,702, discloses another form of coupling. A similar type of coupling asembly is shown in the patent to Norton, et al, U.S. Pat. No. 3,836,114. Livingston, in U.S. Pat. No. 3,138,393, shows a coupling for substantially axially fixed conduits. Burning, U.S. Pat. No. 3,317,220, shows a releasable fluid coupling. Wurmser, in U.S. Pat. No. 2,631,872, discloses a quick coupling. Pasker, in U.S. Pat. No. 2,599,935, shows a hydraulic line coupling. Clark, et al, in U.S. Pat. No. 2,452,430, shows a quick disconnect coupling. Clark, in U.S. Pat. No. 2,860,893, shows a ball detent type coupling with break-away features. Morrison, in U.S. Pat. No. 4,124,228, shows a pressure-balanced coupling. These are examples of various prior art breakaway coupling devices, primarily for use within a fluid flow line, and, in certain instances, are of the breakaway type.

It is therefore, the principal object of this invention, to provide a breakaway coupling incorporating closure valves that are particularly useful in the fuel dispensing art, and which coupling upon separation provides for sealed closure preventing any further flow of fuel through the flow line.

Another object of this invention is to provide a breakaway hose coupling in which internal pressures generated within the coupling during its functioning within a flow line have no effect upon such emplaced coupling and as a result, prevents undersirable fuel leakage, or untimely separation, of the type heretofore caused in other connectors through the generation of these internal fluid pressures.

A further object of this invention is to provide a hose decoupling device that is designed to pull apart at a predetermined force, with said force being unaffected by any of the internal fluid pressures that may be generated within the coupling during its routine usage.

Yet another object of this invention is to provide in a decoupling device the function where the separation of its components is aided once separation commences, through these internally generated fluid pressures, at the location where these separable components are normally sealed in their connection with each other.

Still another object of this invention is to provide a structured decoupling device, that incorporates internal cavities or chambers, which are sealed, and which have generated therein internal fluid pressure that functions in such a manner as to create a force equal and opposite to the primary force that tends to prematurely case separation of the decoupling device.

Another object of this invention is to provide a decoupling device wherein its detent balls are normally located within seats and which are held generally outwardly thereof, and into a locked engagement during normal and routine usage of the coupler when installed within a fluid flow line.

A futher object of this invention is to provide a breakaway coupling wherein its operative components may be preset for disengagement of its separable parts upon exertion of a predetermined externally applied tension force, and once separated, its shut off valves effectively seal off the further passage of fluid in either direction or from either hose section, but in addition, the break away coupling can be easily reassembled, with a minimum of force, upon the single reinsertion of one component into the other.

Still another object of this invention is to provide ball detent positioning means that effectively retain the ball detents within their seated position within the decoupling device, but which means are conveniently positioned for allowing a disengagement, of the decoupling device, upon the exertion of a predetermined quantity of tensioning force.

Still another object of this invention is to provide means for regulating the degree of tensioning force to be exerted upon a decoupling device to effect its disconnection.

These and other objects will become more apparent to those skilled in the art upon reviewing the summary of this invention, and upon undertaking a study of the description of its preferred embodiment, in view of the drawings.

SUMMARY OF THE INVENTION

This invention contemplates the formation of a breakaway hose coupling, of the type that may be used within a fluid flow line, but preferably a fuel line such as one that conveys gasoline from a dispensing pump to and through a nozzle into a vehicle fuel tank. More preferably, this invention has been designed containing rather unique components that provide for and assure the retention of the coupling device in its connected and assembled state, and to prevent any leakage, or untimely disconnection from occurring as a result of any internally generated forces, such as fluid flow or fluid spike pressures, that may spontaneously occur within the flow line, usually during the pumping of fuel, but more particularly when the flow of fuel suddenly stops. This feature is primarily encountered through the recognition that, as previously explained with respect to the prior art, a disparity of forces acting against various parts of earlier decoupling devices, and because such detriment has not been recognized or given consideration, causes premature malfunctioning due to a greater force acting against one of the separable components of the breakaway coupling, than the other, such that when any instantaneous pressure may be encountered within the coupling device, the substantial and significant forces generated internally effect a break apart of the coupling, in an untimely fashion. And, even if the disparity of forces generated within the coupling are not sufficient to cause an untimely decoupling, such internal pressures, and their inequality of directionally exerted forces, at least has a tendency to cause an incipient partial separation, and enough of an opening within the coupling device that undesirable leakage will at least occur. Hence, this current invention is constructed containing designed components, fabricated into a particular configuration, so that any internal forces generated by the fluids passing within the flow line and the decoupling device, are equal to each other, in discrete directions, and therefore, do not effect any substantial and unequal force in one direction than the other, within the coupling device, and thereby prevent untimely disconnection, or a distortion of the coupling that can even cause leakage.

Generally, as well known in the art, breakaway hose couplings are usually designed to provide separation when errant drivers unthinkingly pull away from the station pumps, with the gasoline nozzle and hose still arranged connected within their vehicles fill-tank.

Under such a drive away situation, it is well documented that when disconnection occurs during such situations, breakage of the hose occurs, and without the usage of some type of decoupling device, as explained in this current invention, fuel continues to be pumped and spilled over the entire service station grounds. This is a very hazardous and disastrous predicament. Utilizing a breakaway coupling of this invention, when such unthoughtful disconnection occurs, because of inadvertent drive away, further fuel flow is prevented and curtailed.

In addition, as previously explained, even when the prior art type of decoupling devices are used in conjunction with a fuel flow line, and even when they are being routinely used in the proper manner, internal fluid spikes or water hammer type of pressures are generated within the fuel lines, and the enormous pressures that instantaneously build up can cause an untimely separation of the decoupling devices, or even at least some undesirable fuel leakage. Hence, this current invention has been designed, as previously summarized, to provide a way to prevent any untimely disconnection, because of internal fluid pressures, and even to avoid leakage, by providing designed cavities within the breakaway coupling device, of the type that tend to equalize the disparity of any pressures generated within the coupling, and thereby prevent any of these spiked and instantaneous pressures from acting more upon one of the coupling's fittings, than the other, and thereby prevent untimely disconnection.

These are conditions that can cause unwanted breakaway hose coupling separations, and as explained, such nusiance and sometimes harmful separations result in equipment down time. In most instances, these nusiance breaks are caused by an immediate sudden build-up of pressure inside the fueling hose. A sudden pressure increase travels through the hose to the breakaway coupling, in the manner as previously described, and forces it apart. The sudden pressure build-up can be caused when a nozzle immediately shuts off while fueling under high volume, high pressure, or typical conditions. The sudden build-up of pressure in the fuel line can even cause, as previously explained, the coupling to separate. However, an even greater pressure can be created when a forced stretching of the hose constricts its internal diameter, as when being abusively used.

The breakaway hose coupling of this invention eliminates these nusiance types of breaks. The unit of this invention has a pressure balancing chamber within it, as explained, that overrides any sudden increase in pressure within the hose, during application. The breakaway coupling of this invention will still under routine usage separate under a drive away situation, when a predetermined force is exerted upon it, such as a two hundred pound pull force, as set, as when a drive away occurs. And, when this detrimental condition is encountered, and the coupling does separate as planned, it prevents a disastrous fuel spill. But, as explained, the coupling of this device has further been designed and improved so as not to prematurely separate when subjected to internal line shock pressures, a condition that generally causes unneccessary coupling breaks, in prior art decoupling devices, if not at least leakage in proximity of the device.

In addition to the foregoing, the breakaway hose coupling of this invention is one that can be quickly and easily manually snapped back together after a drive away break, by anyone exerting just normal force against the two separated fittings, and normally a force of approximately twenty pounds is needed, and then the unit is reassembled and ready for complete reusage. No other parts are needed, or are required for replacement or reconditioning for immediate routine usage of the fuel pumping facilities in which the coupling device is installed.

The general features of this invention include a pair of fittings, that are capable of being connected together, but in their separate condition, each includes a valve seat, and a poppet like or other valve, which normally rests in closure against its respective valve seat. But, one of the poppet valves contains an extension, such that when the two fittings are brought together, their valves are forced apart from each other, and lifted from their respective valve seats, to provide a convenient flow path through which fuel or other fluids may flow through the flow line in which the coupling locates. One of the fittings includes a sleeve means, slidably mounted thereon, with said fitting further including a stationary means, or seal ring, which is fixedly sealed internally of the sleeve, and while it leaves the fitting to shift within the sleeve in one direction, it acts as a stop against an inwardly shifting of the fitting, when it encounters the said stationary means. One of the fittings has a series of detents provided proximate its inward end, and they are designed for normally seating within a detent seat groove formed within the inner surface of the sleeve, so that when the detents of one fitting engage within and seat within the sleeve groove, the two fittings are maintained together into connection, and the breakaway coupling will be properly assembled, and held in its functional and usable condition.

The fitting operatively associated with the seal ring also includes an extension that extends partially within the second fitting. That extension also slidably mounts thereon a boss means or more specifically a latch ring, and that boss means is designed for forcing the detents outwardly within the detent seat, of the sleeve, when the coupling has been properly assembled into its operative condition. But, that latch ring is capable of shiftable movement upon the fitting extension, such that when a tensioning force is exerted upon the two fittings, tending to pull them apart, both fittings tend to move in a direction out of their surrounding sleeve, whereby said ring shifts from its holding position against the detents, longitudinally thereof, thereby allowing the detents to fall inwardly and disengage from their seat within the sleeve formed detent groove. When that occurs, the second fitting is free to disengage from within the coupling, to separate from it, at which time both of the poppet valves are then free to shift into closure against their respective fitting valve seats, to provide for closure, and prevent any flow of fluid through either of the separated fittings, as disconnected. The reverse action occurs when the two fittings are brought together into rconnection.

But, in order to achieve that condition, as previously summarized, with regard to the structured chamber arranged within the coupling device that has a tendency to equalize the pressure inside the fueling hose, and within the coupling device, the chamber is formed through the arrangement of an additional ring, called a step ring, that is normally spring biased away from the seal ring, but which chamber is in communication with the fitting internally, so as to allow a select quantity of fluid under the same pressure to freely enter into the formed space, or chamber as called, thereby providing the same build-up of fluid presssure within the said formed chamber, as exists internally within the coupling itself, to thereby retard any shifting of the latch and step rings to prevent detent means unseating and premature disconnection. And, the arrangement and size of this formed chamber has been designed and calculated to provide surface areas, within the coupling device, and against which the fluid pressure encounters, to be exactly equal or equivalent to the areas at the location of the fitting's point of connection, so that the degree of force generated in one direction longitudinally of the coupling, as a result of a sudden increase of internal fluid pressure, will be exactly equal and opposite to the fluid pressure generated in the opposite direction. Thus, the disparity of force as previously explained, existing in prior art devices, and which has a tendency to cause decoupling, when a pressure spike occurs, is alleviated in the design of this current invention, because there is no pressure disparity that exists, or can occur, and thus, any equal and opposite forces generated do not have a tendency to cause disconnection, or even leakage, for that matter.

The foregoing can be generally reviewed in FIG. 6, where a schematic of the concept of this invention is generally disclosed, particularly with respect to that aspect relating to the design of the internal characteristics of the fittings such that any internal pressure generated within the coupling device will have equal and opposite forces generated, so that an unbalancing of forces does not exist, and an untimely disconnection does not occur, as a result of such internal pressures. For example, A indicates a first fitting, and which has slidably located therein a second fitting B. A slidably fits within B at the location C. As in this invention, a formed chamber, as at D, is provided, and is in communication with the chamber, as provided by means of the orifice E. A flow line would normally be provided through the fittings A and B, as at the location F, but in this particular schematic, the ends are sealed off, simply for illustrative purposes. As fluid pressure internally builds up within the combined fittings A and B, there normally would be excessive force to the right, on the fitting B, than to the left, on the fitting A. Such disparity of force would normally have a tendency to cause the two fittings to tend to separate, particularly when sudden build-up of high pressure occurs within the fitting, when it is located within a fuel flow line, in a manner as previously defined. But, by providing a chamber D, in communication with the flow line F, the same fluid discharges into the chamber D, the same fluid pressures are maintained therein, and the design of the chamber D can be made such that it provides for an equalization of the forces of the pressure in each direction, so as to minimize, if not eliminate, any unequal or imbalanced forces generated upon the two fittings, when sudden internal pressure is encountered. This is generally the principle that is designed into the current invention, and the configuration of its various components, and the designed chamber, and the purpose of their functioning, will be better understood upon the provision of a description of the preferred embodiment.

DESCRIPTION OF THE PREFERRED EMBODIMENT

Figure 1:
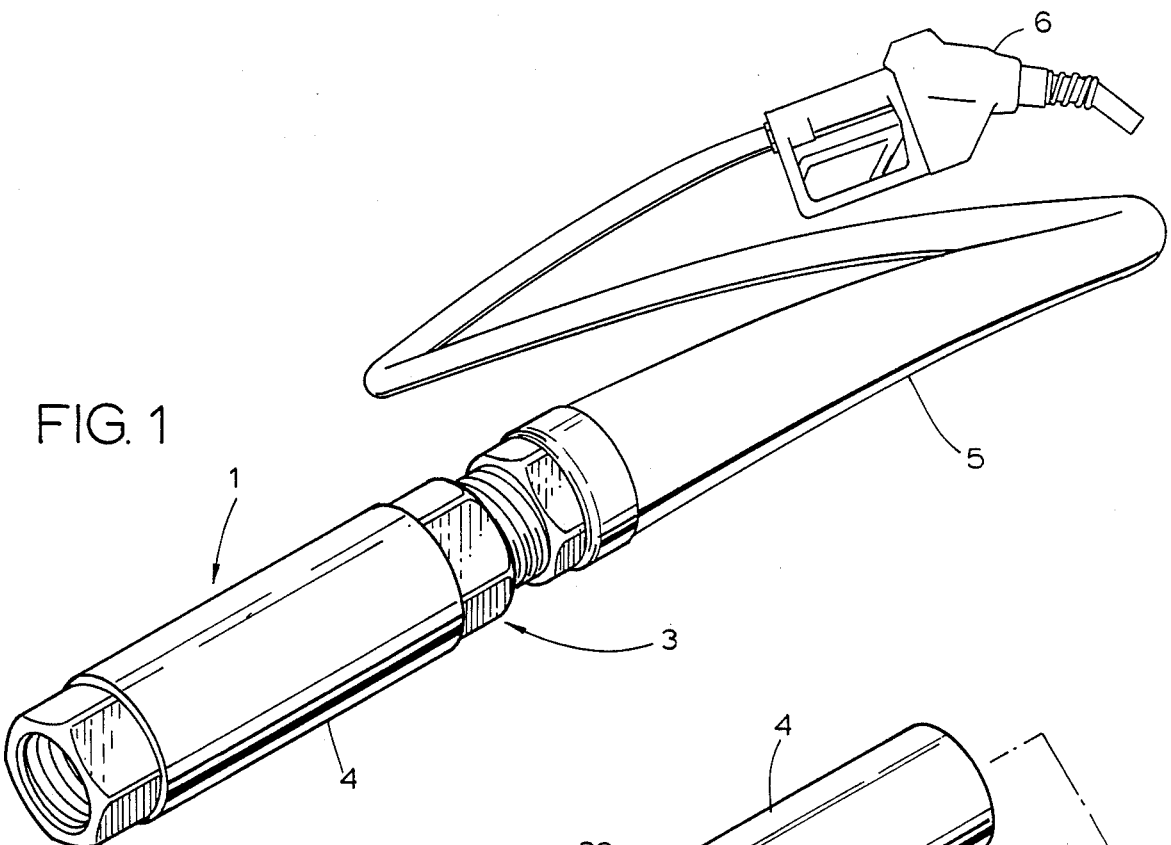
FIG. 1 shows the breakaway hose coupling of this invention, as assembled to and in a fuel hose, connecting at its opposite end with the fuel dispensing nozzle.

In referring to the drawings, and in particular FIG. 1, the breakaway hose coupling 1 of this invention is disclosed, and comprises a pair of fittings 2 and 3, that connect and which have the fuel line and nozzle mounted thereon, in the manner to be subsequently explained. A sleeve 4 is provided upon the coupling 1. The coupling connects at one end with a fuel line hose 5, or which may connect at its other end with a fuel dispensing nozzle 6, as shown, or within additional hose line.

Figure 2:
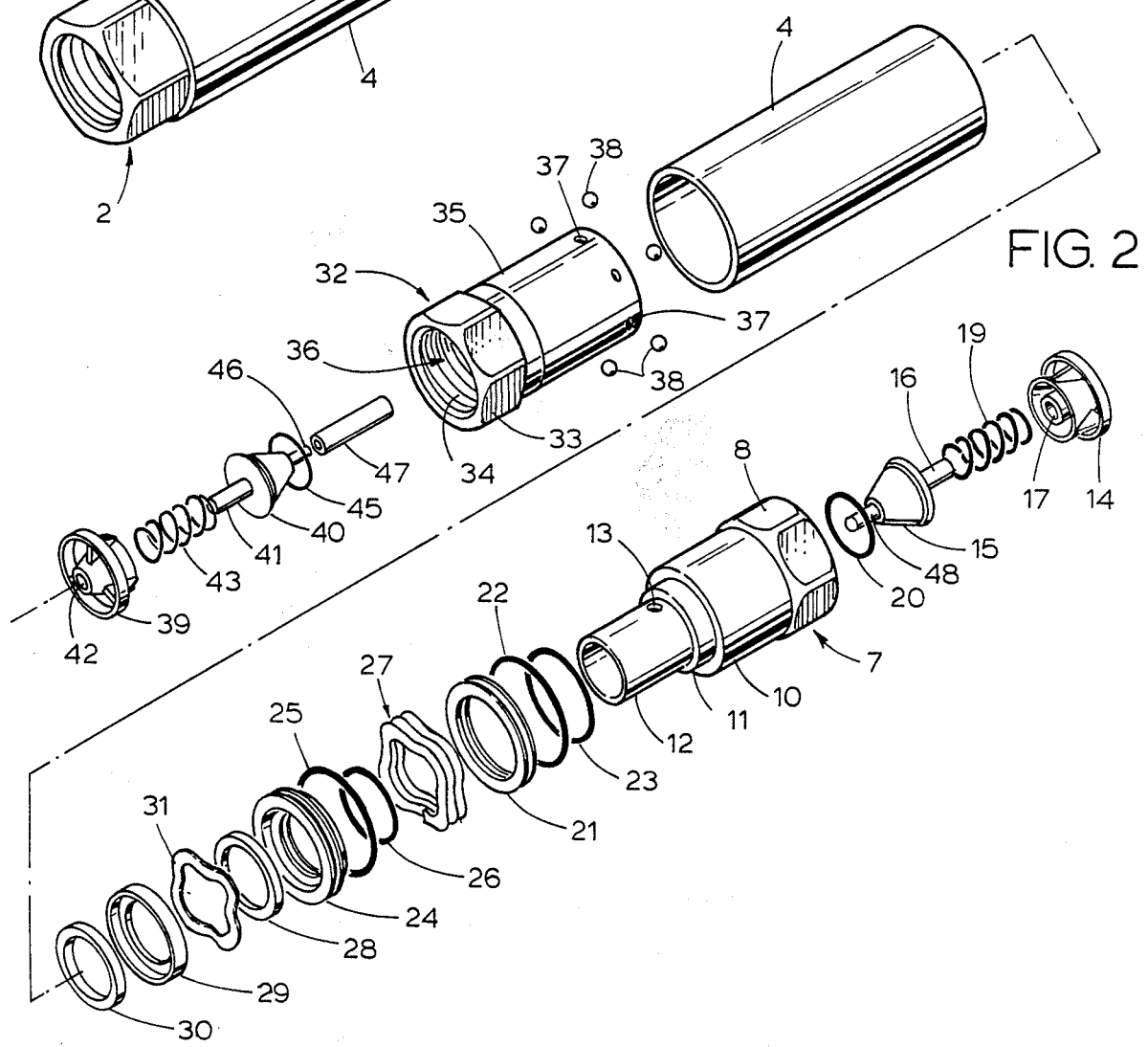
FIG. 2 provides an exploded view of the various components assembled into the breakaway hose coupling of this invention.

In referring to FIG. 2, the individual components that make up the coupling 1 of this invention are disclosed, in exploded view. As can be seen, a first fitting 7, corresponding to 3, includes a nut like member 8, and which incorporates internal threads, as at 9, to provide for its threaded engagement onto one of a fuel line hose or nozzle. See also FIG. 3. The member 7 includes a forward extension, as at 10, and which is designed for fitting within the sleeve 4, but yet having limited slidability within said sleeve, in a manner to be subsequently described. A further integral shoulder 11 is provided forwardly of the extension 10, and integrally connected forwardly thereof is another extension 12, as noted. The extension 12 has at least one aperture or orifice, as at 13, provided therethrough, for purposes to be subsequently described.

Figure 3:
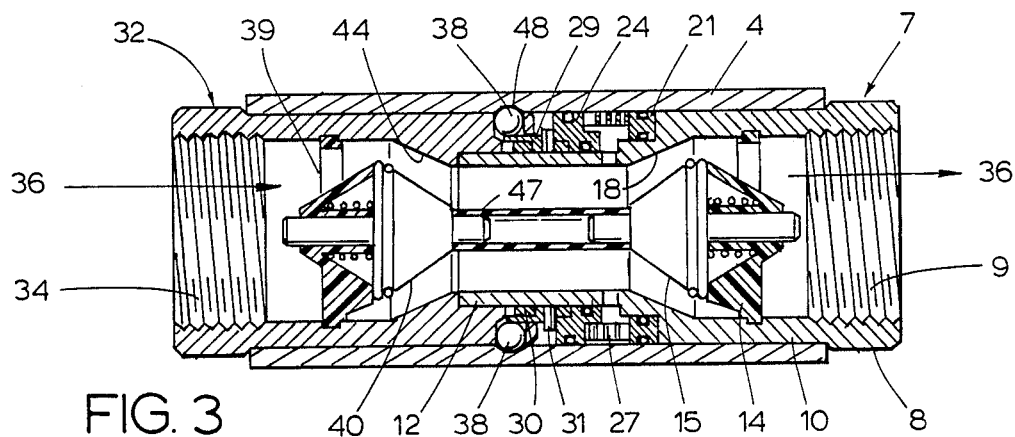
FIG. 3 is a longitudinal sectional view of the breakaway hose coupling in its assembled and usable condition.

Disposed for mounting within the fitting 7, and more particularly within its extension 10, is a spider like mount 14, which is stationarily fixed therein, and provides a means for supporting of the poppet valve 15 within the fitting. The poppet valve 15 contains a stem 16, and the stem is designed for slidably fitting within the support sleeve 17 formed of the mount 14. A spring 19 surrounds the support stem 17, and biases against the back surface of the poppet valve 15, and thereby normally biases the said poppet valve forwardly within its fitting 7, and into engagement with the formed valve seat, as at 18, within said fitting, as can be seen in FIG. 3. An O-ring 20 mounts upon the surface of the poppet valve 15, to provide sealed closure for the poppet valve, when it enters into closure against its cooperating valve seat 18.

Provided for slidably mounting upon the shoulder 11 is a stationary means or seal ring 21, and which means is formed in the configuration of a ring, as noted, having an O-ring 22 mounted upon its outer circumference or perimeter, with another O-ring 23 provided internally thereof, and to provide for sealed but limited sliding movement of the fitting 7 therein. But, this ring 21, through the agency of its O-ring 22, tightly and permanently fits within the interior of the sleeve 4, and in this manner, tends to fix the fitting 7, for limited longitudinal movement with respect to the sleeve 4, during its assembly and usage.

Figure 6:
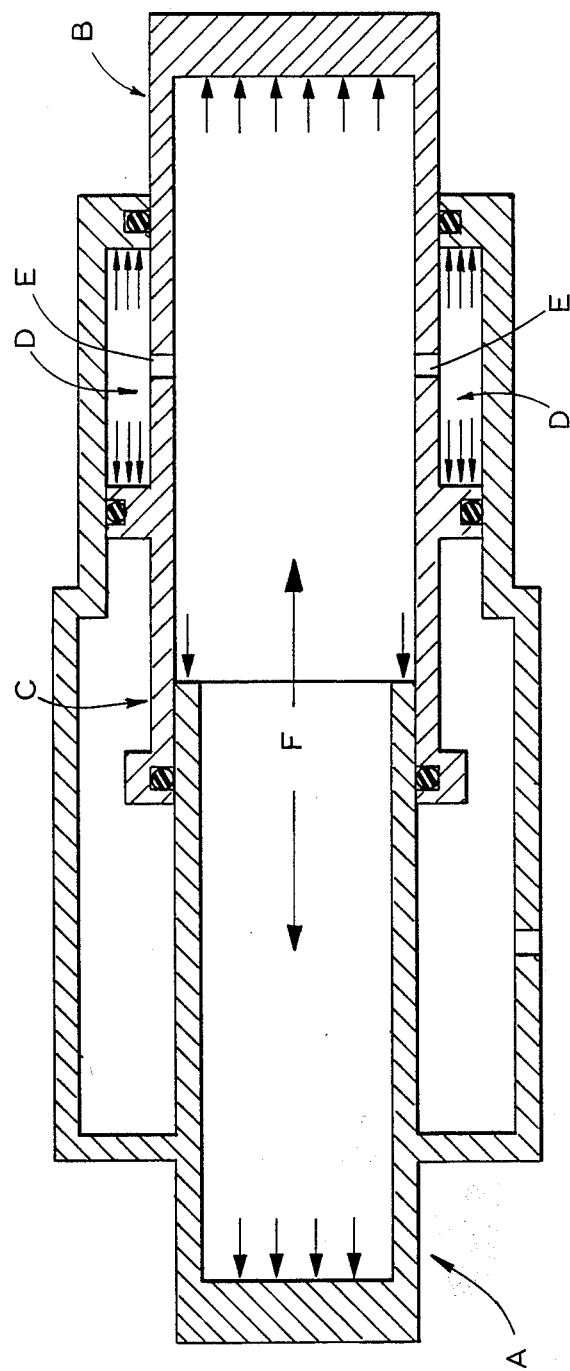
FIG. 6, as previously explained, is a schematic view of the internal structure of the concept of this invention in furnishing a supplemental chamber that is used to equalize the opposite forces generated within the coupling when a sudden high internal pressure is encountered during fuel flow, or when it is initiated, or just shut off.

Another ring means 2,, in this instance identified as a step ring, is designed for slidably fitting upon the frontal extension 12, of the fitting 7, and it includes a series of O-rings, as at 25 and 26, which respectively seat upon the outer and inner perimeters of the said ring 24, as it slide mounts upon the said extension 12. A series of preloaded wave or disc springs 27 are designed for arrangement upon the extension 12, and bias between the stationary means or ring 21, and the movable ring 24, when both are arranged upon the fitting 7. But, it must be noted that this space between the ring 24, and the seal ring 21, forms that supplemental fluid pressure chamber, similar to the chamber D, as previously summarized, with respect to FIG. 6, and which is designed to equalize and balance the forces generated within the coupling, so as to prevent inadvertent or untimely disconnection of the coupling, when sudden internal pressure may develop within the fuel hose line, and its coupling, in the manner as previously explained. Pressure developed therein biases againt the step ring 24 which acts to prevent untimely disconnection. It is also to be noted that the orifice 13 is in alignment with the springs 27, between the rings 21 and 24, in order to allow that fluid from within the fitting to pass through said aperture and into the formed chamber, and to pervade the same pressure therein, as explained.

A press ring 28 tightly fits upon the extension 12, and in this manner is designed for being encountered by the step ring 24, to limit its forward movement, while at the same time allowing it to shift rearwardly, against the pressure of the springs 27, for purposes to be subsequently described.

Also slidably mounted upon the extension 12 is a detent boss means 29, which is also known by the nomenclature latch ring, and which is fixed against forward movement by means of a press ring 30 that also tightly fits upon the extension 12, when assembled. But, the latch ring or means 29 is capable of rearward shifting, upon the extension 12, and against the pressure of a spring 31, which also seats upon the extension 12, between the ring 29, and the said step ring 24.

All of the components as previously described, are assembled in conjunction with the first fitting 7, and in combination with the sleeve 4, form a first operative half of the breakaway coupling of this invention.

As also disclosed in FIG. 2, a second fitting 32, corresponding to the previous fitting 2, includes a nut like formed member 33, having a series of internal threads located therein, as at 34, which likewise are designed for providing a connection of this second fitting to either the opposite extending hose, or other fuel line, as explained. The fitting 32 includes a forward extension 35, integrally formed with the nut like member 33, and as can be seen, there is a passage or channel provided therethrough, as at 36, that allows for fluid to be conveyed through the coupling device, during it assembly and usage. At the frontal end of the extension 35 are a series of apertures, as at 37, and each aperture is designed for holding a detent ball 38 which may be fixed within the aperture by means of peening, or other structural holding means, but yet provides for limited radial movement of the balls, between detent engaging and holding positions wherein the second fitting 32 is held fixed within the sleeve 4, but when said balls are shifted internally thereof, providing for disconnection.

Provided for fixed mounting within the extension 35 is the spider mount 39, and it likewise supports the poppet valve 40, whose rearward extension 41 fits within the stem support 42, formed within the mount 39, and with the spring 43 normally biasing the poppet valve 40 against the valve seat 44 formed within the fitting 32. See also FIG. 3. An O-ring 45 fits on the valve 40, so as to assure a fluid tight seal when the valve is seated upon its valve seat, as can be understood. There is a forward extension 46 provided forwardly of the poppet valve 40, and it supports a separator tube or spacer 47, such that when the fitting 32 is conveniently installed fully within the fitting 7, and its sleeve 4, the separator stem 47 biases against the stem 48 of the oppositely aligned poppet valve 15, and thereby forces both of said poppet valves to unseat from their respective valve seats, in a manner as will be subsequently described.

In referring to FIG. 3, which provides a cross-sectional longitudinal view of the breakaway hose coupling of this invention, the coupling is shown in its assembled state, ready for usage and application as applied within a fluid flow line, or having a fuel line threadily engaged at one end, and a nozzle connected at the other. These components will threadily connect with the thread means 9, or 34, provided at either ends of the respective fittings 7 and 32.

The various component parts as previously described can be readily seen assembled within this view, and include the fitting 7, which has its nut like portion 8 integrally formed with a forward extension 10, and having the further forward extension 12, as noted. The mount 14 supports the poppet valve 15 within the fitting, and arranges it for seating against the valve seat 18, as when the coupling separates. In addition, the outer sleeve 4 connects onto the fitting 7, and is disposed for limited sliding movement thereon, but which is reasonably locked in position by means of the locking means or seal ring 21, as previously explained. In addition, provided for limited sliding but sealed contact upon the extension 12 is also the step ring 24, which is spaced from the seal ring 21, by means of the springs 27, as shown. Furthermore, the latch ring 29 is positioned for limited sliding movement upon the extension 12, but is locked against further forward movement by means of its cooperating fastener ring 30. But, this latch ring 29 is continuously biased against the fastener ring 30 by means of its spring 31, as shown.

The detent balls 38 are disclosed, in this particular embodiment, seated within the detent groove 48 that is formed around the inner perimeter of the sleeve 4.

The fitting 32 is disclosed inserted within the opposite end of the sleeve 4, and carries the detent balls 38 within seats at its one end, as previously explained, and likewise incorporates its mount 39, for retaining the poppet valve 40 in proximity and in alignment with the valve seat 44. But, when the coupling is assembled into its useful configuration, as shown in this particular figure, the spacer means 47 biases against both of the poppet valves, and displaces them from their respective valve seats, so as to provide a clear flow path, as at 36, through the coupling. Obviously, this flow path could be in either direction, but as explained herein as moving from left to right, simply for illustrative purposes.

The various pressures predesigned into the coupling of this invention are calculated to furnish the required coupling strength that is necessary to maintain the breakaway hose coupling in its operative configuration, and to resist separation. Obviously, this type of pressure can be varied, depending upon the resiliency and spring strength of the various springs 31 and 27, built into and assembled into the device. But, in the preferred embodiment, it has been designed to withstand tensioning forces exerted upon the fuel line hose in an approximate two hundred pounds of tensioning force. Most of this force is attained through the springs 27, which must be contracted, through the exertion of the force placed upon them by means of the step ring 24. On the other hand, the amount of force required to re-engage the coupling, once it has been separated, is generally dictated by the latch spring 31, and generally this force is calculated within the range of approximately twenty pounds of compressive pressure exerted upon the two fittings, as they are pushed back together, into re-engagement.

Figure 4:
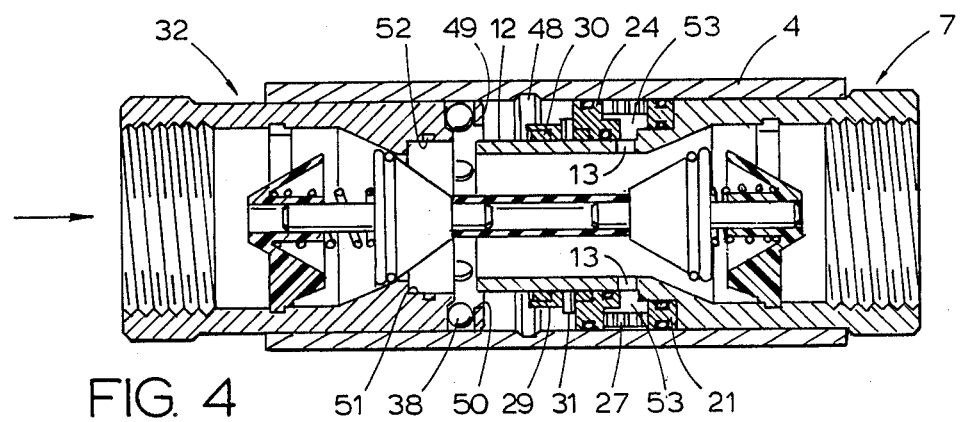
FIG. 4 is a longitudinal sectional view of the breakaway coupling in that instance when one fitting is in the position of being inserted into a coupled connection, or is in the process of decoupling.

As shown in FIG. 4, the re-engagement of the coupling is generally achieved as follows. The frontal portion or 49 of the fitting 32, and which mounts the detent balls 38 for radial shifting, has a stepped inward counterbore, as at 50. In addition, there is a second counterbore 51 provided within the front of the fitting 32, and it includes a groove, as at 52, which seats an O-ring. As the fitting 32 shifts within the sleeve 4, it can be seen that the detent balls 38 are forced radially inwardly, by means of the interior surface of the sleeve 4. As movement continues, the front of the extension 12 slides within the counterbore 51, rides over the O-ring provided within the groove 52, and forms a fluidic seal thereat. This seals the coupling against leakage. At the same time, and simultaneously the detent balls 38 engage against the frontal tip of the latch ring 29, and through forceful further movement of the fitting 32, the detent balls force the latch ring against the pressure of its proximate spring 31, through the exertion of approximately twenty pounds of compressive force, until such time as the latch ring shifts towards the ring 24, upon the extension 12, until an alignment of the detent balls 18 is established with the seating groove 48, when the detents snap into the groove, which thereby allows clearance for the latch ring 29 to once again be shifted by means of its spring 31 to the left, and disposed interiorly of the detents 38, thereby retaining them seated within their groove 48, and maintaining a coupling relationship for the fittings 32 and 7, in maintaining the coupling into its operative condition. Thus, the fuel can now naturally flow through the coupling, the sealed relationship between the extension 12, and the counterbore 51, through the O-ring arranged within the seat 52, prevents leakage of any fluid at that location. In addition, as previously explained, the poppet valves will be maintained spacedly from their respective valve seats, in the manner as explained in FIG. 3, allowing fluid to naturally flow by way of the channel 36 and through the coupling.

Simultaneous with the foregoing, and while the coupling is being used under normal conditions, the same fluid flowing through the coupling enters through the apertures 13, and into the formed chamber 53 wherein the springs 27 locate, to provide for that counter balancing of forces particularly when heavy spikes of instantaneous pressure are exerted by the fuel flowing through the flow line, and the coupling, as previously explained. This chamber 53 corresponds to the chamber D, as previously summarized in FIG. 6. Thus, when a heavy spike of pressure is generated within the flowing fuel, said pressure likewise flows into the chamber 53, is generated therein, and in combination with the springs 53, have a tendency to force fully maintain the step ring 24 against the spring 31, which continues to force the latch ring 29 against its retainer ring 30, and thus seated interiorly of the detents 38, maintaining them within the detent groove 48. In addition, since the step ring 24, and the fastening ring 21, both are sealed by means of their respective O-rings, as can be seen, the generated fluid pressure will be precluded from leaking out of the coupling, at these locations. Thus, a fluidic sealed relationship is maintained within the coupling, at all times. Nevertheless, this pressure generated within the chamber 53, provides for a balancing of the forces of pressure generated by means of fluid pressure within the flow line, in the manner as previously explained in FIG. 6, since it is the same pressure, and thereby prevents that untimely decoupling of the device, or leakage of fuel therefrom, to overcome the type of problems associated with prior art breakaway devices utilized for related purposes.

Figure 5:
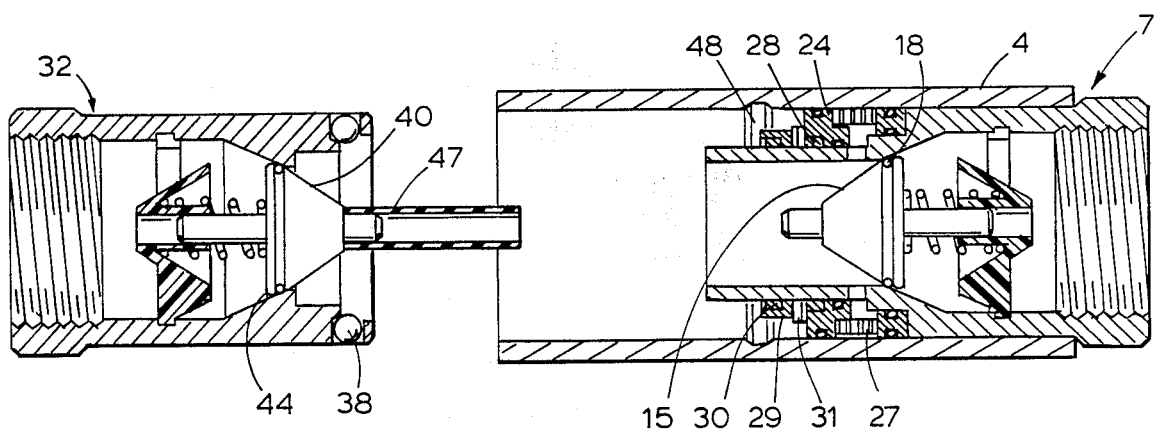
FIG. 5 discloses the breakaway hose coupling of this invention with one fitting being disconnected from the other fitting.

To effect a normal disengagement of the coupling device during its usage, such as when a tensioning force may be exerted upon the fuel line in which the coupler is located, reference is made to FIG. 5. When a tensioning force is exerted upon the coupling, by way of the fuel line hoses, as when a drive away occurs, said forces are exerted directly upon the fittings 7 and 32. As the pulling force is exerted upon these components, obviously, there is a tendency for the tensioning force exerted upon the fitting 32 to translate to the detents 38, in an effort that tends to achieve their withdrawal from seating within the detent groove 48, formed interiorly of the sleeve 4. But, because the latch ring 29 is still in a position arranged interiorly of the detents 38, they cannot remove from said groove 48. On the other hand, as the tensioning pressure builds up and approaches, in this particular embodiment, approximately two hundred pounds of force, the same pressure is exerted upon the fitting 7, through its interconnected hose, and this force tends to pull the fitting 7 to the right, slightly out of its sleeve 4, and this is effected by the efforts of the retainer ring 28, which forcefully shifts and pulls the step ring 24 to the right, against the compression of the springs 27, causing their retraction, while simultaneously the latch ring 29, through the efforts of its retaining ring 30, is likewise pulled to the right, in an effort that tends to withdraw the fitting 7 slightly from within the sleeve 4, and this clearance provide by means of the contraction of the springs 27, in addition to the spring 31, withdraws the latch 17 sufficiently from its position within the detents 38, allowing them to slide inwardly radially out of their seating groove 48, to provide for an instantaneous disengagement of the fitting 32 from within the sleeve 4, and disconnection from the fitting 7, as can be readily seen. As this occurs, simultaneously the spacer means 47 allows the poppet valve 40 to be spring biased against its valve seat 44, while simultaneously, the poppet valve 15 is spring biased against its respective valve seat 18, in the manner as previously described. Thus, when disconnection has occurred, because of the exertion of the tensioning force upon the fuel line in which the coupling inserts, and through the exertion of such force physically upon the coupling 1 itself, the coupling disconnects, the various poppet valves instantaneously close, preventing the flow or leakage of any further fuel, even though a break has occurred, thereby preventing the hazardous spillage of fuel or other fluids onto the surrounding area, as previously explained.

Thus, this invention provides means for functioning as a breakaway hose coupling device, to prevent untimely spillage when a disconnection of the coupling occurs, within a fuel line. But, in addition, and as previously described and summarized, the internal pressure generated by means of pressure spikes that occur within the fuel that flows through the flow line, and even though said spikes may reach rather excessive pressure levels, because of the configuration of this device, which provides for a locating of fuel at precise positions and chambers within the device, provides a balancing of forces between these generated pressures, which prevents an untimely breakaway of the device, and likewise, avoids unnecessary and unwanted leakage, when such an internal fluid pressure predicament occurs.

Variations and modifications to the subject matter of this invention may occur to those skilled in the art upon review of the disclosure provided herein. Such variations or modifications, if within the spirit of this invention, are intended to be encompassed within the scope of any claims to patent protection issuing upon this invention. The description of the preferred embodiment set forth herein, in addition to its drawings, are provided for illustrative purposes only.

Having thus described the invention, what is claimed and desired to be secured by Letters Patent is:

1. A breakaway coupling for application within a fluid flow line, and of the type that normally remains connected when subject the routine flow of fluid therethrough, but capable of disconnection when an excessive external tensioning force is exerted upon the line and its coupling, said coupling including a first fitting for coupling to one of a flow line and nozzle, and a second fitting for connecting to the other of a flow line and nozzle, a pair of valve means, one of each valve means shiftably disposed within each fitting, each fitting having a valve seat for seating of its respective valve means after decoupling, one of said valve means having an extension therewith, and disposed for encountering the other valve means during routine coupling to hold the valve means unseated from their respective valve seats and allowing fluid to pass through the flow line and the breakaway coupling during normal usage, a sleeve shiftably supported on said first fitting, a stationary means retained within said sleeve and providing a stop against movement in one direction of said first fitting within said sleeve, said first fitting extending through said stationary means, a boss means slidably mounted on said extending fitting and disposed for engagement by said second fitting when the coupling is maintained in engagement, spring means provided upon said fitting extension and maintained between said boss means and the stationary means, said sleeve having detent seat means provided therein, and said second fitting having at least one detent disposed for seating within said detent seat means, and being retained therein by said boss means during routine coupling, a chamber formed between the sleeve and the fitting extension and disposed for reception therein of fluid from the flow line to thereby provide for equalization of fluid forces generated within the coupling during routine fluid flow to prevent premature decoupling and leakage of the hose coupling, whereby upon exertion of external tensioning force tending to separate the two fittings the first fitting and its boss means longitudinally shift away from the second fitting to provide unseating of the detent and disconnection of the hose coupling, while the valve means attain a seating upon their respective valve seats to block further flow of fluid through the coupling.

2. A breakaway coupling for application within a fuel flow line, and of the type that normally remains connected when subject to routine flow of fuel therethrough, but capable of disconnection when an excessive external tensioning force is exerted upon the line and its coupling, said coupling including a first fitting for coupling to one of a flow line and nozzle, and a second fitting for connecting to the other of a flow line and nozzle, a pair of valve means, one of each valve means shiftably disposed within each fitting, each fitting having a valve seat for seating of its respective valve means after decoupling, one of said valve means having an extension therewith, and disposed for encountering the other valve means during routine coupling to hold the valve means unseated from the valve seats and allowing fuel to pass through the flow line and the breakaway coupling during normal usage, a sleeve shiftably supported on said first fitting, a stationary means retained within said sleeve and providing a stop against movement in one direction of said first fitting within said sleeve, said first fitting extending through said stationary means, a boss means slidably mounted on said extending fitting and disposed for engagement by said second fitting when the coupling is maintained in engagement, spring means provided upon said fitting extension and maintained between said boss means and the stationary means, said sleeve having detent seat means provided therein, and said second fitting having at least one detent disposed for seating within said detent seat means, and being retained therein by said means during routine coupling, whereby upon exertion of external tensioning force tending to separate the two fittings, the first fitting and its boss means longitudinally shift away from the second fitting to provide unseating of the detent and disconnection of the hose coupling, while the valve means attain a seating upon the respective valve seats to prevent further flow of fuel therethrough.

3. The invention of claim 2 and wherein said stationary means comprising a seal ring, permanently sealed within said sleeve, said first fitting extension extending through said seal ring, said seal ring preventing said first fitting from shifting in one longitudinal direction, but allowing said first fitting to shift a limited distance in a second and opposite longitudinal direction, said boss means comprising a latch ring, a step ring provided upon said fitting extension and disposed between said seal ring and said latch ring, a first spring means biasing said step ring away from said seal ring, and a second spring means biasing said latch ring away from said step ring.

4. The invention of claim 3 and wherein said latch ring during routine connection of the breakaway coupling normally biasing said detent into said detent seat means for maintaining hose coupling.

5. The invention of claim 4 and wherein during exertion of a tensioning force upon the hose coupling, said first and second fittings being urged apart, whereby said step ring biases against said first spring means to urge it against said seal ring to thereby provide clearance of the latch ring to shift with respect to the detent means for allowing unseating from the detent seat means and producing separation of the first and second fittings, and disconnection of the hose coupling.

6. The invention of claim 5 and wherein said latch ring disposed for contact by said detent means during connection of the hose coupling, thereby urging said latch ring against the bias of the second spring means to provide for clearance for entrance of the detent means into the detent seat means of the sleeve, and thereby allowing shifting of the latch means towards interiorly of the detent means to maintain normal hose coupling.

7. The invention of claim 6 and including a chamber formed between the sleeve and the first fitting extension, and between the seal ring and step ring, an aperture provided through the first fitting extension to allow fluid to pass from the flow channel into said formed chamber, whereby the disposition of fluid within said chamber tending to counterbalance fluid pressure generated within the fuel flow line and the coupling and urging said pressure against said step ring to prevent premature disconnection of said hose coupling.

* * * * *